United States Patent

Herzig et al.

[11] Patent Number: 6,008,332
[45] Date of Patent: Dec. 28, 1999

[54] PHTHALIMIDYLAZO DYES, PROCESS FOR THEIR PREPARATION AND THE USE THEREOF

[75] Inventors: Paul Herzig, Basel; Romeo Dreier, Fehren, both of Switzerland

[73] Assignee: Ciba Specialty Chemicals Corporation, Tarrytown, N.Y.

[21] Appl. No.: 08/682,201

[22] Filed: Jul. 17, 1996

Related U.S. Application Data

[63] Continuation of application No. 08/385,861, Feb. 9, 1995, abandoned.

[30] Foreign Application Priority Data

Feb. 11, 1994 [CH] Switzerland ................ 413/94

[51] Int. Cl.$^6$ ............ C09B 29/036; C09B 29/09; D06P 1/18; D06P 3/42
[52] U.S. Cl. ..................... 534/789; 534/730; 534/731
[58] Field of Search .................... 534/789, 730, 534/731

[56] References Cited

U.S. PATENT DOCUMENTS

| | | | |
|---|---|---|---|
| 3,980,634 | 9/1976 | Weaver . | |
| 4,039,522 | 8/1977 | Weaver et al. | 260/152 |
| 4,324,719 | 4/1982 | Weaver et al. | 260/152 |
| 4,734,490 | 3/1988 | Schwander et al. | 534/782 |
| 5,218,095 | 6/1993 | Trottmann | 534/789 |

FOREIGN PATENT DOCUMENTS

| | | | |
|---|---|---|---|
| 776561 | 1/1968 | Canada | 53/489 |
| 0787424 | 6/1986 | Canada | 534/789 |
| 0443984 A1 | 8/1991 | European Pat. Off. | 534/789 |
| 0623654 | 11/1994 | European Pat. Off. | 534/789 |
| 2164198 | 6/1973 | Germany | 534/789 |

OTHER PUBLICATIONS

Kerre et al, Indian Journal of Technology, vol. 9, pp. 175–178, May, 1971.
Journal of the Society of Dyers and Colourists, vol. 97, No. 2, Feb. 1981, pp. 72–75, J. Szadowski et al.
Journal of the Society of Dyers and Colourists, vol. 97, No. 8, Aug. 1981, pp. 358–362, J. Szadowski et al.
Journal of the Society of Dyers and Colourists, vol. 101, Mar. 1985, pp. 105–108, J. Szadowski, et al.

Primary Examiner—Floyd D. Higel
Attorney, Agent, or Firm—Kevin T. Mansfield; David R. Crichton

[57] ABSTRACT

Disperse azo dyes of formula

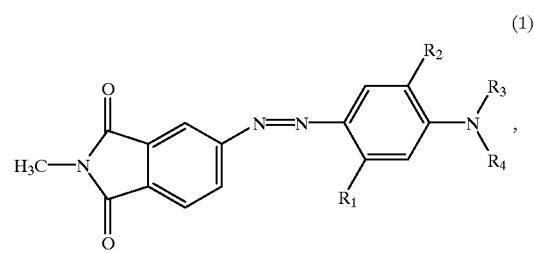

(1)

wherein
$R_1$ is hydrogen, $C_1$–$C_2$alkyl, halogen, NH—CO—$R_5$ or O—$SO_2$—$R_6$; $R_2$ is hydrogen, halogen, $C_1$–$C_4$alkyl, unsubstituted $C_1$–$C_8$alkoxy or $C_1$–$C_8$alkoxy which is substituted by halogen, cyano, phenyl, —Y—$C_1$–$C_8$alkyl or —Y-phenyl; $R_3$ is unsubstituted $C_1$–$C_8$alkyl or $C_1$–$C_8$alkyl which is substituted by hydroxy, cyano, vinyl, phenyl, halogen, —X-phenyl or —X—$C_1$–$C_8$alkyl, and —X—$C_1$–$C_8$alkyl may be substituted by halogen or cyano and —X-phenyl may be substituted by $C_1$–$C_4$alkyl, $C_1$–$C_4$alkoxy or halogen; $R_4$ is hydrogen or, independently of $R_3$, has the meaning of $R_3$, and $R_3$ and $R_4$, together with the linking nitrogen atom, can also be a heterocyclic radical; $R_5$ is unsubstituted $C_1$–$C_3$alkyl or $C_1$–$C_3$alkyl which is substituted by halogen, phenyl, cyano or $C_1$–$C_3$alkoxy; $R_6$ is unsubstituted $C_1$–$C_4$alkyl or $C_1$–$C_4$alkyl which is substituted by halogen, cyano or phenyl, and phenyl in turn may be substituted by $C_1$–$C_4$alkyl, $C_1$-$C_4$alkoxy or halogen; Y is a linking group of formula —O—, —S— or —$SO_2$—; and X is a linking group of formula —O—,

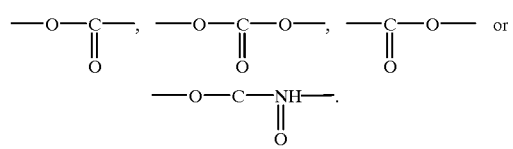

The novel disperse azo dyes of formula (1) are suitable in particular for dyeing polyester textile material.

14 Claims, No Drawings

PHTHALIMIDYLAZO DYES, PROCESS FOR THEIR PREPARATION AND THE USE THEREOF

This is a continuation of application Ser. No. 08/385,861, filed Feb. 9, 1995, abandoned.

The present invention relates to disperse azo dyes containing a N-methylphthalimide diazo component and an aniline coupling component, to a process for the preparation of said dyes, and to the use thereof for dyeing textile materials, in particular polyester.

Some disperse azo dyes containing a N-alkylphthalimide diazo component and an aniline coupling component are known. However, these dyes do not meet current requirements in every respect, for example fastness to thermomigration, light or washing.

It is the object of the present invention to provide disperse azo dyes which meet current requirements.

Surprisingly, the novel disperse azo dyes of formula (1) fulfill the requirements mentioned above.

The novel disperse azo dyes have the formula

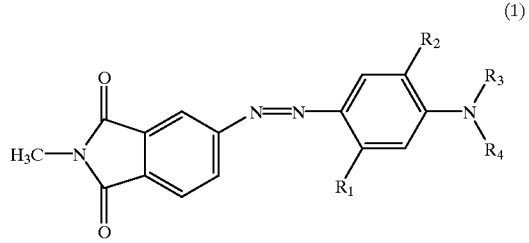

(1)

wherein $R_1$ is hydrogen, $C_1$–$C_2$alkyl, halogen, NH—CO—$R_5$ or O—$SO_2$—$R_6$;

$R_2$ is hydrogen, halogen, $C_1$–$C_4$alkyl, unsubstituted $C_1$–$C_8$alkoxy or $C_1$–$C_8$alkoxy which is substituted by halogen, cyano, phenyl, —Y—$C_1$–$C_8$alkyl or —Y-phenyl;

$R_3$ is unsubstituted $C_1$–$C_8$alkyl or $C_1$–$C_8$alkyl which is substituted by hydroxy, cyano, vinyl, phenyl, halogen, —X-phenyl or —X—$C_1$–C8alkyl, and —X—$C_1$–$C_8$alkyl may be substituted by halogen or cyano and —X-phenyl may be substituted by $C_1$–$C_4$alkyl, $C_1$–$C_4$alkoxy or halogen;

$R_4$ is hydrogen or, independently of $R_3$, has the meaning of $R_3$, and $R_3$ and $R_4$, together with the linking nitrogen atom, can also be a heterocyclic radical;

$R_5$ is unsubstituted $C_1$–$C_3$alkyl or $C_1$–$C_3$alkyl which is substituted by halogen, phenyl, cyano or $C_1$–$C_3$alkoxy;

$R_6$ is unsubstituted $C_1$–$C_4$alkyl or $C_1$–$C_4$alkyl which is substituted by halogen, cyano or phenyl, and phenyl in turn is unsubstituted or substituted by $C_1$–$C_4$alkyl, $C_1$–$C_4$alkoxy or halogen;

Y is a linking group of formula —O—, —S— or —$SO_2$—; and

X is a linking group of formula

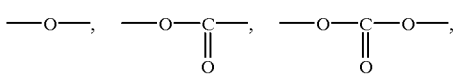

-continued

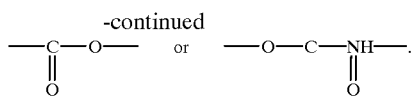

$R_1$, $R_2$, $R_3$, $R_5$ or $R_6$ defined as an unsubstituted alkyl radical can be straight-chain or branched from $C_3$. Suitable alkyl radicals are, in accordance with the number of carbon atoms, typically methyl, ethyl, n- or isopropyl, n-, iso-, sec- or tert-butyl, straight-chain or branched pentyl, hexyl, heptyl or octyl. Alkyl radicals containing 1 to 4 carbon atoms are preferred. Methyl or ethyl is most preferred.

When $R_2$ is a $C_1$–$C_8$alkoxy radical which is substituted by halogen, cyano, phenyl, —Y—$C_1$–$C_8$alkyl or —Y-phenyl, said $C_1$–$C_8$alkoxy radical, like the —Y—$C_1$–$C_8$alkyl radical, can be straight-chain or, from $C_3$, branched. Suitable alkyl radicals are typically methyl, ethyl, n- or isopropyl, n-, iso-, see- or tert-butyl, straight-chain or branched pentyl, hexyl, heptyl or octyl; and suitable alkoxy radicals are typically methoxy, ethoxy, straight-chain or branched propoxy, butoxy, pentoxy, hexoxy, heptoxy or octoxy.

When $R_3$ or $R_4$ is a $C_1$–$C_8$alkyl radical which is substituted by hydroxy, cyano, vinyl, phenyl, halogen, —X—$C_1$–$C_8$alkyl or —X-phenyl, said $C_1$–$C_8$alkyl radical, like the —X—$C_1$–C8alkyl radical, can be straight-chain or, from $C_3$, branched. Suitable alkyl radicals are those listed above.

$R_3$ and $R_4$ are preferably $C_1$–$C_4$alkyl radicals which are substituted by hydroxy, chloro or a —X—$C_1$–$C_4$alkyl radical, wherein X is a linking group of formula O—,

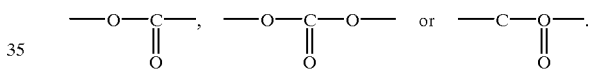

Particularly preferred linking groups X are those of formula

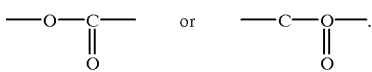

$R_3$ and $R_4$, together with the linking nitrogen atom, can also be a heterocyclic radical, typically pyrrolidino, piperidino, morpholino or piperazino.

When $R_5$ is a $C_1$–$C_3$alkyl radical which is substituted by halogen, cyano, phenyl or $C_1$–$C_3$alkoxy, said $C_1$–$C_3$alkyl radical, like the $C_1$–$C_3$alkoxy radical, can be straight-chain or, from $C_3$, branched. Suitable alkyl radicals are those listed above.

When $R_6$ is a $C_1$–$C_4$alkyl radical substituted by halogen, cyano or phenyl, said $C_1$–$C_4$alkyl radical may be straight-chain or, from $C_3$, branched. Suitable alkyl radicals are those listed above.

Halogen is typically fluoro, bromo or, preferably, chloro.

$R_2$, $R_3$, $R_4$, $R_5$ and $R_6$ may carry one or more than one of the substituents listed above.

Illustrative examples of substituted $R_2$ radicals are chloroethoxy, cyanoethoxy or 2-ethoxyethoxy.

Illustrative examples of substituted $R_3$ or $R_4$ radicals are hydroxyethyl, hydroxypropyl, chloroethyl, 2-hydroxy-3-chloropropyl, allyl, cyanoethyl, chloroethylcarbonyloxyethyl, methoxyethyl, ethoxypropyl, methoxycarbonylethyl, ethoxycarbonylethyl, acetoxyethyl, propionyloxyethyl, methoxycarbonyloxyethyl, ethoxycarbonyloxyethyl, butylamino-carbonyloxyethyl or chloroethylaminocarbonyloxyethyl.

Illustrative examples of substituted $R_5$ radicals are chloroethyl, cyanoethyl, benzyl or methoxyethyl.

Illustrative examples of substituted R6 radicals are chloroethyl, cyanoethyl or benzyl.

Particularly suitable novel dyes are those of formula (1), wherein $R_1$ is hydrogen, methyl or NH—CH—$R_5$', and $R_5$' is unsubstituted $C_1$–$C_3$alkyl or $C_1$–$C_3$alkyl which is substituted by chloro or cyano; or $R_2$ is hydrogen, chloro, methyl or methoxy; or $R_3$ is $C_1$–$C_4$alkyl which is unsubstituted or substituted by hydroxy, chloro, cyano, phenyl or

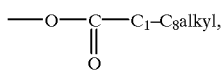

and

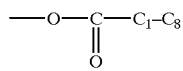

alkyl in turn is substituted by chloro; or $R_4$ is hydrogen or $C_1$–$C_4$alkyl which is unsubstituted or substituted by hydroxy, chloro, cyano,

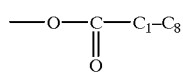

alkyl or phenyl.

Further very particularly suitable novel dyes are those of formula (1), wherein $R_1$ is hydrogen, methyl, chloro, NH—CH—CH$_3$, NH—CH—CH$_2$-CH$_3$, NH—CH—CH$_2$-CH$_2$Cl, O—SO$_2$—CH$_3$ or O—SO$_2$—C$_6$H$_5$; $R_2$ is hydrogen, methyl, methoxy or chloro; $R_3$ is methyl, ethyl, propyl, CH$_2$—CH$_2$—CN, CH$_2$-CH$_2$—OH, CH$_2$-CH$_2$Cl, CH$_2$-C$_6$H$_5$, CH$_2$—CH(OH)—CH$_3$, CH$_2$-CH=CH$_2$, CH$_2$—CH(OH)—CH$_2$Cl, CH$_2$-CH$_2$—O—CO—CH$_3$, CH$_2$-CH$_2$—O—CO—CH$_2$-CH$_2$Cl,;

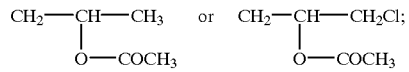

and $R_4$ is hydrogen, ethyl, propyl, CH$_2$-CH$_2$—CN, CH$_2$-CH$_2$—OH, CH$_2$-CH$_2$—O—CO—CH$_3$ or CH$_2$-C$_6$H$_5$.

$R_3$ is most preferably methyl, ethyl or $C_1$–$C_4$alkyl which is substituted by cyano or phenyl.

$R_4$ is most preferably methyl, ethyl or $C_1$–$C_4$alkyl which is substituted by cyano or phenyl.

A particularly preferred embodiment of the invention relates to azo dyes of formulae

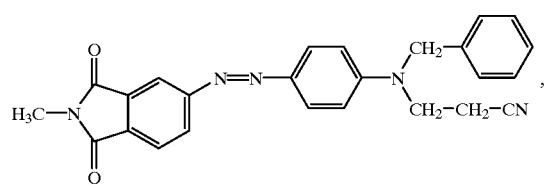

(1)

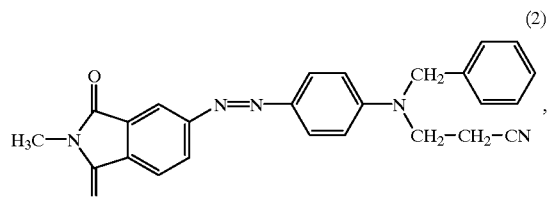

(2)

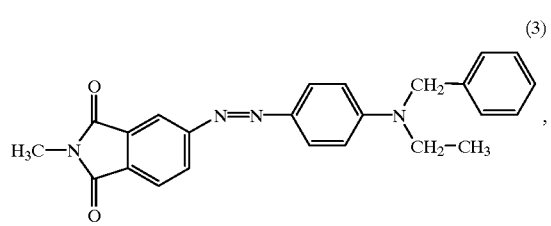

(3)

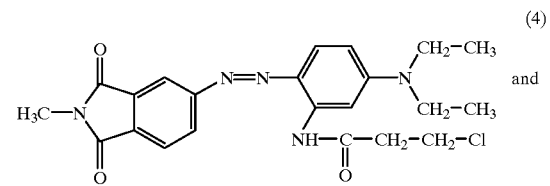

(4)

and

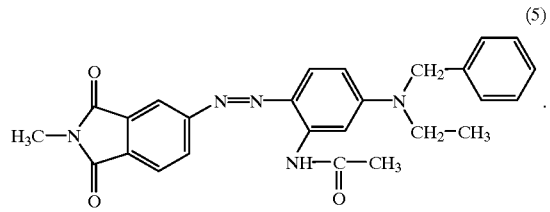

(5)

The present invention further relates to a process for the preparation of the novel dyes. This process comprises diazotising a phthalimide of formula

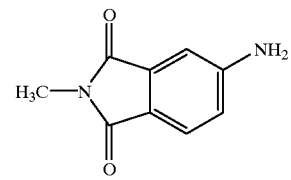

(6)

and coupling the diazonium compound so obtained to a coupling component of formula

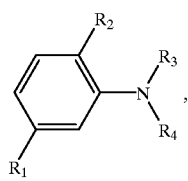

(7)

wherein $R_1$, $R_2$, $R_3$ and $R_4$ are as defined in formula (1).

The compounds of formulae (6) and (7) are known or can be prepared in per se known manner, and the diazotisation and coupling are carried out in customary manner.

Dyes of formula (1), wherein $R_1$, $R_2$ or $R_3$ is a radical of formula -alkylene-X-alkyl, can also be obtained by first preparing a dye containing a precursor of these radicals, typically a hydroxyalkyl group, and then converting this group into a radical of formula -alkylene-X-alkyl.

The novel compounds of formula (1) can be used as dyes for dyeing and printing semisynthetic and, in particular, synthetic hydrophobic fibre materials, especially textile materials. Textile materials of blends comprising such semisynthetic or synthetic hydrophobic textile materials can also be dyed or printed with the novel compounds.

Semisynthetic textile materials are in particular secondary acetate and cellulose triacetate.

Synthetic hydrophobic textile materials mainly consist of linear aromatic polyesters, typically of terephthalic acid and glycols, in particular ethylene glycol or condensates of terephthalic acid and 1,4-bis(hydroxymethyl)cyclohexane; of polycarbonates, typically of α, α-dimethyl-4,4'-dihydroxy-diphenylmethane and phosgene; of fibres based on polyvinyl chloride and polyamide.

The application of the novel compounds to the textile materials is carried out by known dyeing processes. Typically, polyester fibre materials are dyed in the exhaust process from aqueous dispersion in the presence of customary anionic or nonionic dispersants and, if required, customary carriers, in the temperature range from 80 to 140° C. Cellulose secondary acetate is preferably dyed in the temperature range from about 65 to 85° C., and cellulose triacetate in the temperature range of up to 115° C.

The novel dyes do not dye wool and cotton simultaneously present in the dye bath, or dye them only minimally (good reserve), and are accordingly also well suited to dyeing blends of polyester/wool and polyester/cellulose fibre.

The novel dyes are suitable for dyeing by the thermosol process, the exhaust process and for the printing process.

The textile material may be in different forms of presentation, e.g. fibres, filaments or nonwoven fabrics, woven or knitted fabrics.

It is useful to convert the novel dyes prior to their use into a dye formulation. To achieve this, the dye is ground to an average particle size of 0.1 to 10 micron. Grinding can be carried out in the presence of dispersants. Typically, the dried dye is ground with a dispersant or it is kneaded as a paste together with a dispersant and subsequently vacuum dried or spray dried. After the addition of water, the formulations so obtained can be used to prepare print pastes and dye baths.

The customary thickeners are used for printing, typically modified or non-modified natural products such as alginates, British gum, gum arabic, crystal gum, carob bean gum, tragacanth, carboxymethyl cellulose, hydroxyethyl cellulose, starch or synthetic products, e.g. polyacrylamides, polyacrylic acid or the copolymers thereof or polyvinyl alcohols.

The novel dyes dye the materials listed above, in particular the polyester material, in level yellow to violet shades of very good end-use fastness properties, in particular good fastness to light, thermofixation, pleating, chlorine and wet treatments, for example fastness to water, perspiration and washing. The dyeings also have excellent fastness to rubbing. The good fastness to thermomigration of the dyeings so obtained is also to be highlighted.

Furthermore, the novel dyes are well suited to producing combination shades together with other dyes. It will be readily understood that mixtures of the novel dyes with one another can also be used.

The present invention relates to the above use of the novel azo compounds of formula (1) as well as to a process for dyeing or printing semisynthetic or synthetic hydrophobic fibre material, in particular textile material, which process consists of applying to or incorporating in said material one or more than one compound of formula (1). This hydrophobic fibre material is preferably textile polyester material. Further substrates which may be treated by the novel process, as well as preferred process conditions, are discussed in the above detailed description of the use of the novel compounds.

The invention also relates to the hydrophobic fibre material, preferably polyester textile material, dyed or printed by said process.

The novel dyes of formula (1) are also suitable for modem recording processes, such as thermotransfer printing.

The following Examples serve to further illustrate the invention. Parts and percentages are by weight, unless otherwise stated.

EXAMPLE 1

30 parts of 98% sulfuric acid are added dropwise below 20° C. to 80 parts of an acid mixture consisting of one part by volume of propionic acid and 5 parts by volume of acetic acid. To this solution are added dropwise below 15° C. 17.4 parts of 40% nitrosylsulfuric acid. The solution is cooled to 0–5° C. and then 8.8 parts of 4-amino-N-methylphthalimide are added to the solution over 30 min. To this solution are then added a further 50 parts of an acid mixture consisting of one part by volume of propionic acid and 5 parts by volume of acetic acid, and the reaction mixture is stirred for 2 hours at 0–5° C. When diazotisation is complete, 1 part of urea is added and the batch is stirred for a further 15 minutes.

10.5 parts of the coupling component N-ethyl-N-benzylaniline are dissolved in 50 parts of an acid mixture consisting of one part by volume of propionic acid and 5 parts by volume of acetic acid. 30 parts of ice are added to the solution to lower the temperature.

The diazotisation mixture is then run into this solution. After stirring for 30 minutes, the pH is adjusted to 1 with 30% NaOH, and after a further 60 minutes the pH is adjusted to pH 4.5. The azo dye is then completely precipitated with water, isolated by filtration, washed with water and dried, to give 20 parts of an azo dye of formula

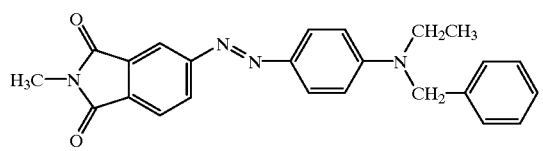

This azo dye dyes polyester in a brilliant orange shade.

The dye can be further purified by slurrying it in hot ethanol and then cooling, filtering and washing the dye with ethanol.

In general accordance with the process described above, the coupling components listed in Table 1 can be used instead of N-ethyl-N-benzylaniline.

TABLE 1

| Ex. | coupling component: | shade |
|---|---|---|
| 2 | 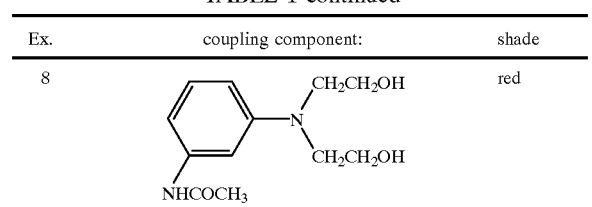 | brilliant orange |
| 3 | 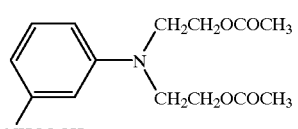 | brilliant orange |
| 4 | 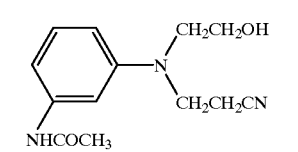 | brilliant orange |
| 5 | 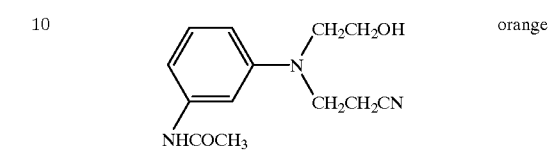 | brilliant orange |
| 6 | 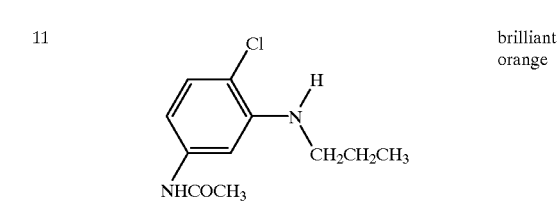 | scarlet |
| 7 | 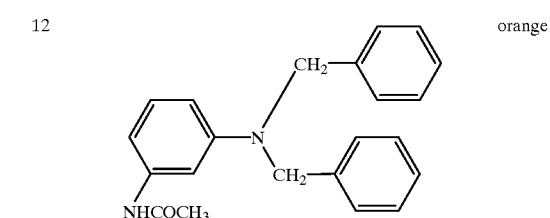 | scarlet |

TABLE 1-continued

| Ex. | coupling component: | shade |
|---|---|---|
| 8 | 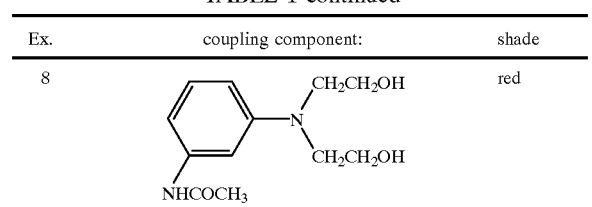 | red |
| 9 | 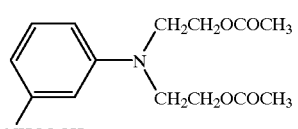 | orange |
| 10 | 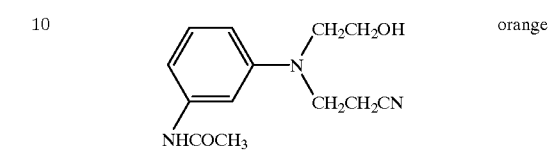 | orange |
| 11 | 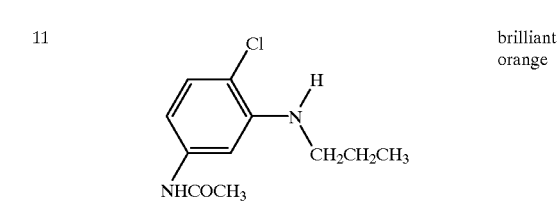 | brilliant orange |
| 12 | 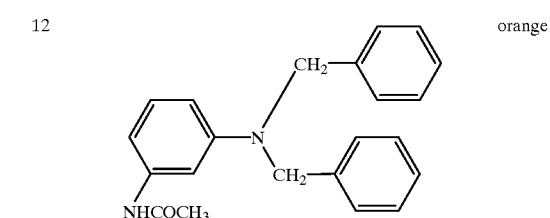 | orange |
| 13 | 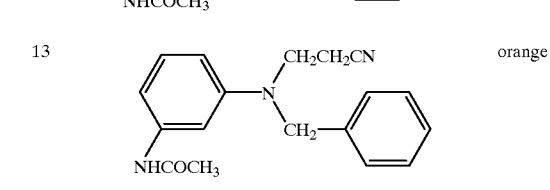 | orange |
| 14 | 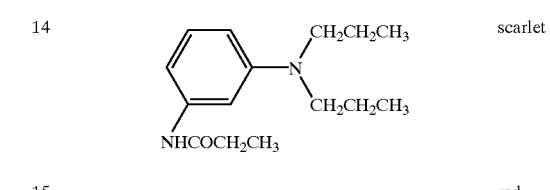 | scarlet |
| 15 | 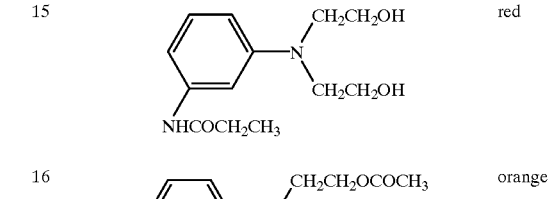 | red |
| 16 | 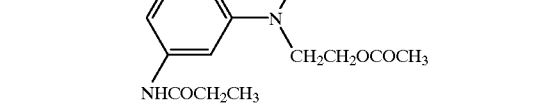 | orange |

TABLE 1-continued

| Ex. | coupling component: | shade |
|-----|---------------------|-------|
| 17 | 3-(N,N-diethylamino)-N'-(3-chloropropanoyl)aniline [phenyl ring with N(CH2CH3)2 and NHCOCH2CH2Cl] | scarlet |
| 18 | 3-(N,N-dipropylamino)-N'-(3-chloropropanoyl)aniline [phenyl ring with N(CH2CH2CH3)2 and NHCOCH2CH2Cl] | scarlet |
| 19 | phenyl ring with OCH3, N(CH2CH3)2, NHCOCH2CH2Cl | ruby |
| 20 | phenyl ring with OCH3, NH(CH2CH3), NHCOCH2CH2Cl | scarlet |
| 21 | phenyl ring with N(CH2CH2-O-CO-CH2CH2Cl)(CH2-phenyl), NHCOCH3 | orange |
| 22 | phenyl ring with N(CH2CH3)(CH2-phenyl), NHCOCH2CH2Cl | scarlet |
| 23 | phenyl ring with N(CH2-phenyl)2, NHCOCH2CH2Cl | orange |
| 24 | phenyl ring with N(CH3)(CH2-phenyl) | brilliant orange |
| 25 | phenyl ring with N(CH2-CH=CH2)(CH2CH2CN) | brilliant orange |
| 26 | phenyl ring with N(CH2CH2OH)(CH2CH2CN), Cl | brilliant orange |
| 27 | phenyl ring with N(CH2CH3)2, O-SO2-CH3 | orange |
| 28 | phenyl ring with N(CH2CH3)2, O-SO2-phenyl | brilliant orange |
| 29 | phenyl ring with OCH3, NH-CH2-phenyl, NHCOCH3 | brilliant orange |
| 30 | phenyl ring with OCH3, N(CH2CH3)(CH2CH2CN), NHCOCH3 | red |
| 31 | phenyl ring with N(CH2CH3)(CH2CH2Cl) | orange |
| 32 | phenyl ring with OCH3, N(CH2CH2-O-CO-CH3)(CH2-phenyl), NHCOCH3 | red |
| 33 | phenyl ring with N(CH2CH2-O-CO-CH3)(CH2-phenyl), NHCOCH3 | orange |

TABLE 1-continued

| Ex. | coupling component | shade |
|---|---|---|
| 34 | 3-(NHCOCH₃)-C₆H₄-N(CH₂CH₂OH)(CH₂C₆H₅) | scarlet |
| 35 | 2-OCH₃-5-(NHCOCH₃)-C₆H₃-N(CH₂CH₂OH)(CH₂C₆H₅) | red |
| 36 | 2-OCH₃-5-(NHCOCH₃)-C₆H₃-N(CH₂CH₃)₂ | ruby |
| 37 | 3-(NHCOCH₃)-C₆H₄-N(CH₂CH₂CN)(CH₂-CH(OH)-CH₂Cl) | orange |
| 38 | 3-(NHCOCH₃)-C₆H₄-N(CH₂CH₂CN)(CH₂-CH(OCOCH₃)-CH₂Cl) | orange |
| 39 | 3-(NHCOCH₃)-C₆H₄-N(CH₂CH₂CN)(CH₂CH₂OH) | orange |
| 40 | 3-(NHCOCH₃)-C₆H₄-N(CH₂CH₂CN)(CH₂CH₂-O-COCH₃) | orange |
| 41 | 3-(NHCOCH₃)-C₆H₄-N(CH₂CH₂CN)(CH₂-CH=CH₂) | orange |
| 42 | 2-Cl-5-(NHCOCH₃)-C₆H₃-NH-CH₂-CH(OH)-CH₃ | orange |
| 43 | 2-Cl-5-(NHCOCH₃)-C₆H₃-NH-CH₂-CH(OCOCH₃)-CH₃ | orange |
| 44 | 2-OCH₃-5-(NHCOCH₃)-C₆H₃-N(CH₂CH₂-O-CO-CH₂CH₂Cl)(CH₂C₆H₅) | red |
| 45 | 3-(NHCOCH₃)-C₆H₄-N(CH₂CH₃)(CH₂C₆H₅) | scarlet |
| 46 | 3-Cl-C₆H₄-N(CH₂CH₂CN)(CH₂CH₂-O-COCH₃) | brilliant orange |

EXAMPLE 47

1 g of the dye described in Example one is milled together with 17 g of water and 2 g of a commercial dispersant of the dinaphthylmethane disulfonate type in a sand mill and converted into a 5% aqueous dispersion. A 1% dyeing (based on pigment and substrate) is produced with this formulation in the high temperature exhaust process at 130° C. on polyester fabric and then given a reductive afterclear. The red dyeing so obtained has very good end-use fastness properties and, in particular, excellent fastness to thermomigration.

The same good fastness properties may be obtained when polyester fabric is dyed with this dye in the thermosol process (10 g/l of dye, liquor uptake 50%, fixing temperature 210° C.).

To test its fastness to thermomigration, the dyed fabric is finished with a textile softener of the distearyl diethylenetriamine type and then heated for 40 seconds to 165° C. The sample is then tested for its fastness to rubbing and washing (60° C.).

What is claimed is:

1. A disperse azo dye of formula

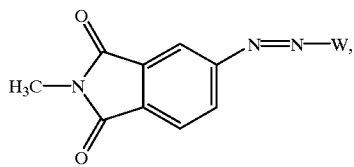

wherein W is a group of formula

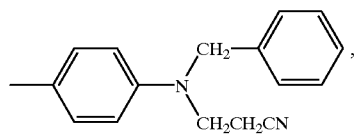

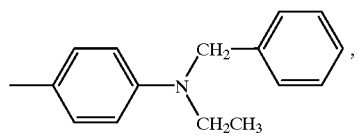

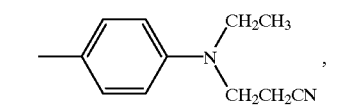

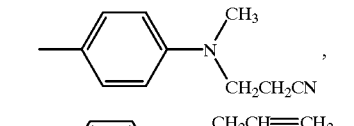

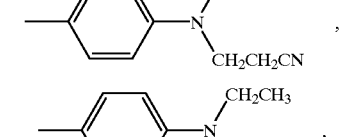

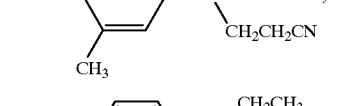

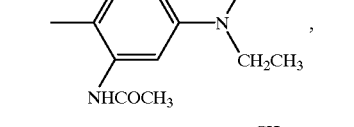

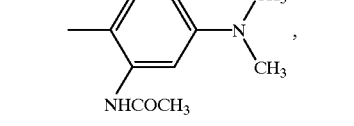

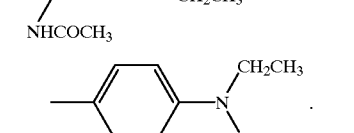

2. The disperse azo dye according to claim 1, of the formula

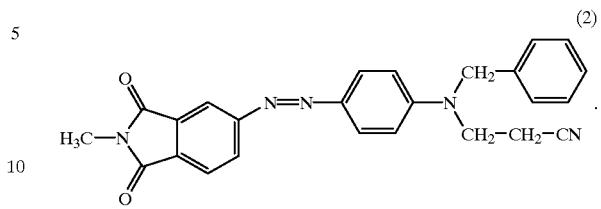

3. The disperse azo dye according to claim 1, of the formula

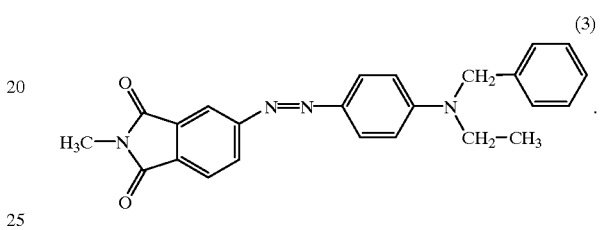

4. The disperse azo dye according to claim 1, of the formula

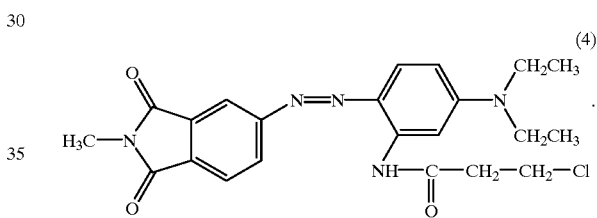

5. The disperse azo dye according to claim 1, of the formula

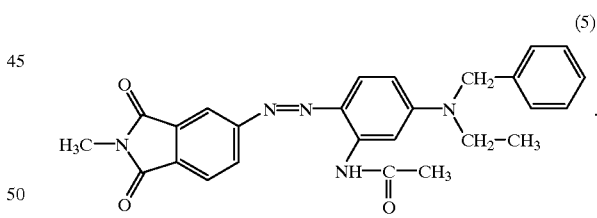

6. The disperse azo dye according to claim 1, of the formula

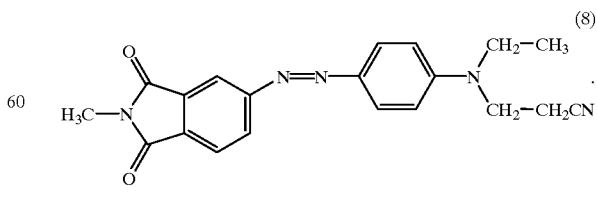

7. The disperse azo dye according to claim 1, of the formula

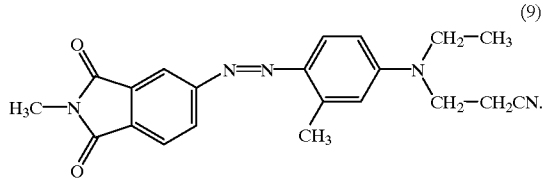

8. The disperse azo dye according to claim 1, of the formula

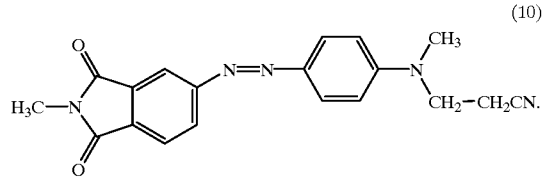

9. The disperse azo dye according to claim 1, of the formula

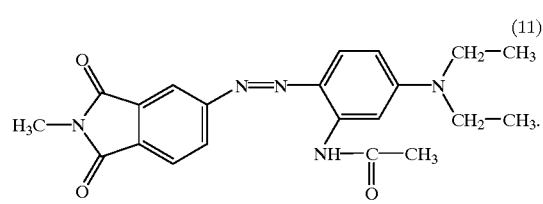

10. The disperse azo dye according to claim 1, of the formula

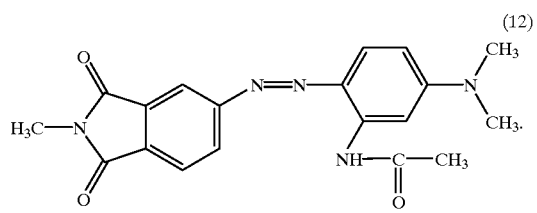

11. The disperse azo dye according to claim 1, of the formula

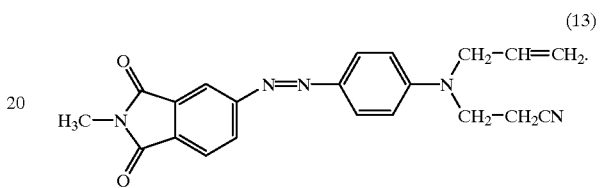

12. A process for dyeing or printing semisynthetic or synthetic hydrophobic fibre material, which comprises applying to or incorporating in said material at least one compound as defined in claim 1.

13. A process according to claim 12, wherein the hydrophobic fibre material consists of polyester fibres.

14. The material dyed or printed according to claim 12.

* * * * *